Aug. 22, 1950
H. J. BEARD
2,519,538
APPARATUS FOR THE HEAT TREATMENT OF CHAIN
LINKS OR OTHER METAL ELEMENTS
Filed Jan. 6, 1949
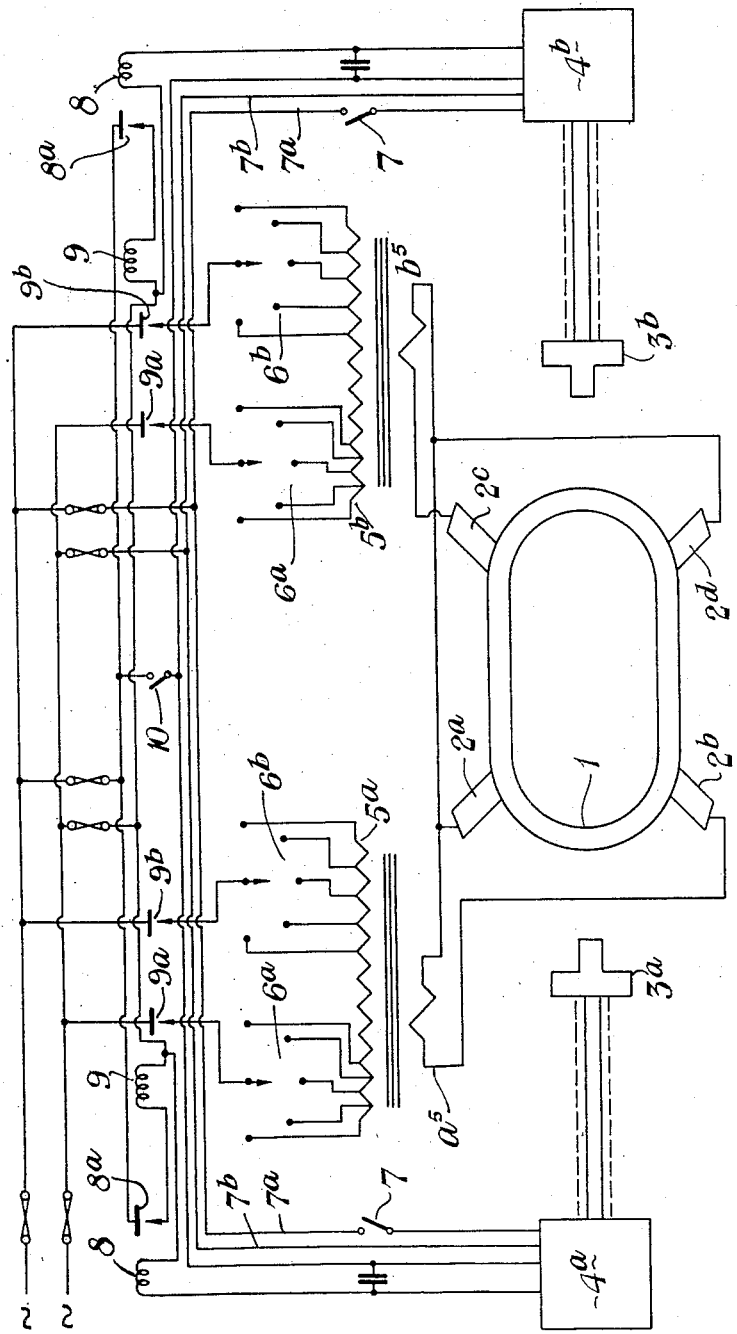
INVENTOR.
HOWARD J. BEARD.
by Haseltine Lake & Co.
AGENTS.

Patented Aug. 22, 1950

2,519,538

UNITED STATES PATENT OFFICE 2,519,538

APPARATUS FOR THE HEAT-TREATMENT OF CHAIN LINKS OR OTHER METAL ELEMENTS

Howard John Beard, Stourport-on-Severn, England, assignor to American Chain & Cable Company, Inc., Bridgeport, Conn.

Application January 6, 1949, Serial No. 69,568
In Great Britain January 12, 1948

4 Claims. (Cl. 219—11)

This invention relates to the heat treatment of chain links, coupling elements for use in chains and other articles, and also objects requiring individual heat treatment. For example, the invention of great utility when used for the treatment of individual links or coupling elements, e. g. following the introduction of a link or other coupling element in a chain when effecting a repair or introducing a coupling element in a length of chain. The present practice in works, e. g. railway works, shipyards, etc., is to heat treat the inserted link by local labour, e. g. in a works smithy or by a local smith, and this has been found to result in the inserted links not having the characteristics essential to withstand the tensile and other strains and stresses which the other links of the chain will withstand by reason of their having been properly heat treated when manufacturing the chain. The object of the present invention is to provide apparatus which can be erected readily in workshops provided with electric power supply, whereby individual link elements or other objects can be heat treated up to or within the necessary temperature range and over the necessary period to ensure the inserted link having the same characteristics as the other links of a chain.

It is of course well known in chain welding machines to heat the successive links by engaging them with copper electrodes connected to a source of electrical energy the supply of which to the links is controlled from a photo-electric cell or cells located in proximity to the welding zone, one example of this method of resistance welding being described in British Patent Specification No. 477,968, in which two photo-electric cells operating in conjunction are exposed to the work, one cell being most sensitive to visible radiations from the work, and the other being most sensitive to radiations of the invisible or infra-red category, a number of relays each incorporating a thyratron type of valve being fed via the cathode of a control valve across which a uni-directional voltage is applied from a transformer with an associated rectifying valve, smoothing choke and condensers, the arrangement being such that the potential of the grids of the thyratrons depends upon the relative values of a resistance, connected across the anode of the control valve and earth, and the D. C. resistance of the control valve, the negative of which is connected to the two cells. That is to say, the grid potential of the control valve depends upon the relative values of the equivalent resistances of the two cells, the thyratrons at certain critical biases actuating relays one of which changes down the welding voltage from a predetermined maximum to a predetermined minimum effective degree, another of which controls the welding temperature and another welding mechanism. A fourth thyratron controls a compressed air line which however, is not required with the present proposed heat treatment means.

In the present invention also, two photo cells and amplifying units are employed, and the engagement of the work piece by the electrodes, e. g. by the inner ends of two symmetrical pairs of electrodes, can be effected by spring means operating through links or levers on the electrode holders, a hand lever or foot pedal overcoming the spring to free the electrodes from their gripping engagement with the work.

According to the present invention apparatus for the heat treatment of individual links, couplings in a chain or other appropriate work pieces, comprises work-engaging electrodes, transformer means for connection to the source of electrical energy, and connecting means for the electrodes and secondaries of the transformer means which produces equal potential at the electrodes and at the ends of each transformer secondary.

In one form of the invention, the apparatus comprises work-engaging electrodes connected in pairs across the secondaries of single phase transformers adapted to be fed from an A. C. source so that each pair of electrodes is connected to a distinctive transformer, said electrodes being connected electrically in such manner as to produce equal potential at the electrodes and at the ends of each transformer secondary, and means to regulate the potential across the electrodes.

In its preferred form the invention embodies transformer means with a number of secondaries, a corresponding number of sets of electrodes, each said set comprising a pair adapted to be engaged with the work, each secondary having two of the electrodes connected across its ends, said two electrodes being one of one set and one of another set of electrodes, means to regulate the potential across the electrodes of each set, and photo or thermo-electric means provided with each set of electrodes and adapted to respond to radiations from the work piece and to actuate said regulating means.

In order that the invention may be clearly understood, reference will now be made to the accompanying drawing.

In carrying the invention into practice a bench of such dimensions that it can be transported reasonably easily and erected in a workshop, would be provided, but details of the bench are not considered essential to illustrate. On top of the bench are provided two symmetrical pairs of heavy service copper electrodes 2a, 2b, and 2c, 2d, substantially radiating from a work receiving space into which the appropriate link or coupling element 1 of a chain to be heat treated is guided, the electrodes being mounted in holders (not shown) which can be spring urged towards the work, so that, e. g. with a link to be heat treated two electrodes press symmetrically against one arcuate end of the link, and the other pair press symmetrically against the other arcuate end of the link.

The two pairs of electrodes are connected across the secondaries $a^5$ and $b^5$ of two single phase transformers $5a$ and $5b$, each adjacent pair of electrodes thereby being connected to their own separate transformer. Two of the diagonally opposed electrodes are then connected to each other electrically, thus assuring an equal potential at both electrodes, also at one end of each transformer secondary coil. The two remaining diagonally opposed electrodes are connected one to each remaining transformer secondary connection, the transformers $5a$ and $5b$ being connected to the A. C. electric supply to synchronize each phase cycle to give the same electrical potential at each of these electrodes when the machine is working, the primary windings being suitably tapped and connected to step switches $6a$ and $6b$ for coarse and fine adjustment to allow for the secondary voltage to be regulated to suit the element being subject to heat treatment.

Two photo-electric cells $3a$ and $3b$, both of the same characteristic, and both responsive to visible radiations, are disposed between the electrodes so as to lie opposite each other so that one is exposed to the influence of rays from one one of the work and the other from the other end of the work.

The cells $3a$ and $3b$ are connected to two electronic control apparatus $4a$ and $4b$ respectively, so that by means of individual circuits each embodying a control valve and, e. g. two, thyratrons as aforesaid, a pair of contactors are controlled from the cells to effect the desired temperature following the work being heated to a predetermined magnitude, whereupon the relay means controlled from the appropriate thyratron is actuated to isolate the work from the source of electrical energy. The circuits and arrangements of valves and thyratrons are not shown as they are well known in the art.

Switches 7 in lines $7a$ and $7b$ are provided to close the circuit to the cells, the appropriate ones of the lines $7a$, $7b$ being connected on the supply side to the cells by the windings of transformers, rectifying valves, and smoothing resistances, the cells thus having a uni-directional voltage applied across them in well known manner. Thyratrons in the apparatus $4a$, $4b$ control the actuation of the relays actuating contactors $8a$ to break the operative circuit, and also control relays 9 actuating contactors $9a$ and $9b$, the contactor $9a$ being connected to the tappings of the steps $6a$ and the contacts $9b$ to the tappings of the steps $6b$, one tapping of each primary giving a comparatively high voltage whilst the other gives a lower voltage. The temperatures at which the thyratrons operate are predetermined by adjustment of a potentiometer to change the grid potential of the thyratrons, also in well known manner.

A foot operated switch for controlling the apparatus is indicated by the reference numeral 10.

I claim:

1. Electrical apparatus for the heat treatment of a link and the like comprising a pair of transformers adapted to be connected to a source of electrical energy, a pair of electrodes connected to the secondary of one transformer and adapted to engage the link on spaced regions of the periphery thereof, a pair of electrodes connected to the secondary of the other transformer and adapted to engage the link on spaced regions of the periphery thereof also spaced from the regions engaged by the first mentioned electrodes, means for regulating the voltage across the secondary of each transformer independently of the voltage across the other, and means confining the current from one transformer to one portion of the periphery of the link and the current from the other transformer to the remainder of the periphery of the link.

2. Apparatus for the heat treatment of a link and the like comprising two single phase transformers adapted to be connected to a source of electrical energy, four electrodes adapted to engage a link at regions spaced around the periphery of a link means connecting two adjacent electrodes to the terminals of the secondary of one transformer, means connecting the other two electrodes to the terminals of the secondary of the other transformer, means electrically connecting two opposite electrodes to each other, and means for regulating the potential across the terminals of one transformer independently of the potential across the terminals of the other.

3. Apparatus for the heat treatment of a link and the like comprising two single phase transformers adapted to be connected to a source of electrical energy, four electrodes adapted to engage a link at regions spaced around the periphery of a link, means connecting two adjacent electrodes to the terminals of the secondary of one transformer, means connecting the other two electrodes to the terminals of the secondary of the other transformer, means electrically connecting two opposite electrodes to each other, means for regulating the potential across the terminals of each transformer independently of the potential across the terminals of the other.

4. Apparatus for the heat treatment of a link and the like comprising transformers adapted to be connected to a source of electrical energy, four electrodes adapted to engage a link at regions spaced around the periphery of a link, means connecting two adjacent electrodes to the terminals of the secondary of one transformer, means connecting the other two electrodes to the terminals of the secondary of the other transformer, means electrically connecting two opposite electrodes to each other, means for regulating the potential across the terminals of each transformer independently of the potential across the terminal of the other, and means responsive to radiation from the portion of the link heated by the current from each transformer for controlling the potential across the terminals of the corresponding transformer.

HOWARD JOHN BEARD.

REFERENCES CITED

The following references are of record in the file of this patent:

UNITED STATES PATENTS

| Number | Name | Date |
|---|---|---|
| 2,233,617 | Lamb | Mar. 4, 1941 |

FOREIGN PATENTS

| Number | Country | Date |
|---|---|---|
| 467,057 | Germany | Oct. 19, 1928 |
| 502,457 | Germany | July 12, 1930 |
| 557,984 | Germany | Aug. 31, 1932 |